(12) United States Patent
Gangstoe et al.

(10) Patent No.: US 7,605,568 B2
(45) Date of Patent: Oct. 20, 2009

(54) DEEP UNDER VOLTAGE RECOVERY IN A BATTERY PACK

(75) Inventors: Gunnar Gangstoe, Trondheim (NO); Arne Aas, Trondheim (NO); Paal Ronny Kastnes, Trondheim (NO); Hideyuki Sato, Chiba (JP)

(73) Assignees: Atmel Corporation, San Jose, CA (US); Sony Corporation, Tokyo (JP)

( * ) Notice: Subject to any disclaimer, the term of this patent is extended or adjusted under 35 U.S.C. 154(b) by 366 days.

(21) Appl. No.: 11/373,843

(22) Filed: Mar. 10, 2006

(65) Prior Publication Data
US 2007/0210757 A1 Sep. 13, 2007

(51) Int. Cl.
H02J 7/00 (2006.01)
H02J 7/04 (2006.01)

(52) U.S. Cl. .................. 320/137; 320/128; 320/130; 320/164

(58) Field of Classification Search .................. 320/106, 320/120, 121, 122, 124, 125, 128, 129, 132, 320/134, 135, 136, 164, 165, 137
See application file for complete search history.

(56) References Cited

U.S. PATENT DOCUMENTS

| | | | | |
|---|---|---|---|---|
| 3,848,181 A * | 11/1974 | Hebert et al. | | 324/429 |
| 4,325,010 A * | 4/1982 | Lowndes | | 318/139 |
| 4,742,290 A | 5/1988 | Sutphin et al. | | |
| 5,272,382 A * | 12/1993 | Heald et al. | | 307/66 |
| 5,304,914 A | 4/1994 | Feldstein et al. | | |
| 5,315,228 A * | 5/1994 | Hess et al. | | 320/106 |
| 5,422,559 A | 6/1995 | Hall et al. | | |
| 5,539,298 A | 7/1996 | Perkins et al. | | |
| 5,631,537 A | 5/1997 | Armstrong | | |
| 5,659,208 A * | 8/1997 | Kimble et al. | | 307/82 |
| 5,783,322 A * | 7/1998 | Nagai et al. | | 429/7 |
| 5,850,136 A * | 12/1998 | Kaneko | | 320/119 |
| 5,896,025 A | 4/1999 | Yamaguchi et al. | | |
| 6,246,214 B1 | 6/2001 | Oglesbee | | |
| 6,690,559 B2 | 2/2004 | Yoshida | | |
| 7,525,291 B1 * | 4/2009 | Ferguson | | 320/164 |
| 7,528,582 B1 * | 5/2009 | Ferguson | | 320/164 |
| 2005/0017688 A1 * | 1/2005 | Stellberger | | 320/134 |

OTHER PUBLICATIONS

PCT International Search Report in corresponding PCT application #PCT/US07/63602 dated Feb. 22, 2008, 2 pages.

* cited by examiner

*Primary Examiner*—Akm E Ullah
*Assistant Examiner*—M'Baye Diao
(74) *Attorney, Agent, or Firm*—Fish & Richardson P.C.

(57) ABSTRACT

In one implementation, a method for charging a battery system is provided. The method includes enabling determining if a charger is coupled to a battery system, the battery system including one or more cells and a charge enable transistor. The method also includes enabling determining if a voltage level of the cells is less than a predetermined first low voltage level. If the voltage level of the cells is less than the predetermined first low voltage level, enabling charging of the cells at a reduced rate including adjusting a voltage applied to the charge transistor gate terminal to regulate a voltage seen by the charger to a level that is less than a predetermined second voltage level. Additionally, when the voltage of the cells reaches the predetermined first low voltage level, the method includes substantially fully enabling the charge transistor to allow for charging at full rate by the charger.

17 Claims, 6 Drawing Sheets

DEEP UNDER VOLTAGE RECOVERY IN A BATTERY PACK

TECHNICAL FIELD

This invention relates to electrical circuits.

BACKGROUND

Many modern portable devices (e.g., laptop computers, mobile phones, digital cameras, video cameras, media players, personal digital assistants (PDAs), game console, etc.) include battery packs. One particular type of conventional battery pack includes one or more battery cells coupled to one or more Integrated Circuit (IC) chips. The chips typically include a controller (e.g., a microcontroller) and circuitry and provide, among other things, battery cell management and protection.

Some conventional battery packs include a Li-ion (Lithium ion) battery cell, which is essentially a volatile chemical reaction packaged inside a cylinder. Potential energy is stored in each cell, and if the battery cell is exposed to conditions outside of its specification the cell can over heat, catch fire or explode. Conventional battery packs configured with these volatile cells typically include fail-safe circuitry for detecting unsafe conditions (e.g., charge or discharge over-currents, short circuits, etc.), and for taking corrective action to prevent damage to the battery cell and/or device, and to protect the end user.

Conventional rechargeable batteries can be charged with a charger after discharge. When certain battery technologies (e.g., Li-ion and Lithium-polymer) are charged, constraints are placed on the charging system to avoid dangerous conditions. One such constraint relates to charging these cells when their cell voltages are below a certain level, what is commonly referred to as a Deep Under Voltage (DUV) condition. A deep under voltage condition can arise after deep discharge, or when the battery pack is charged for the first time. When charging cells from a deep under voltage condition, a lower than normal charge current is typically used for a period of time (i.e., a pre-charge period). After the cell voltage(s) have risen to a certain level, the charger can switch to a normal charge mode so as to minimize charge time for the cell(s). In a conventional system as described, the charger determines when the switch from pre-charge to normal or rapid charge should occur, based, primarily, on the cell(s) voltage level that it sees.

In some conventional battery packs, two external transistors (e.g., field effect transistor (FETs)) are connected in series with the battery cell(s) and are enabled and disabled to allow for the charge and discharge of the cells. The transistors allow the cell(s) to be disconnected from either the charger or the device based on one or more monitored conditions to avoid improper or dangerous operation. In one configuration, referred to as a high-side solution, the two transistors are coupled in series between the positive terminal of the cell(s) and a positive battery pack terminal (e.g., the external positive terminal interface to a device).

SUMMARY

In one implementation, an apparatus, method and computer program product are provided for charging a battery system. In general, in one aspect, a method for charging a battery system is provided. The method includes enabling determining if a charger is coupled to a battery system, the battery system including one or more cells and a charge enable transistor. The method also includes enabling determining if a voltage level of the cells is less than a predetermined first low voltage level. If the voltage level of the cells is less than the predetermined first low voltage level, enabling charging of the cells at a reduced rate including adjusting a voltage applied to the charge transistor gate terminal to regulate a voltage seen by the charger to a level that is less than a predetermined second voltage level. Additionally, when the voltage of the cells reaches the predetermined first low voltage level, the method includes substantially fully enabling the charge transistor to allow for charging at full rate by the charger.

The method can include one or more of the following features. Adjusting a voltage applied to the gate terminal of the charge transistor can include partially enabling the charge transistor. Partially enabling the charge transistor can include partially enabling the charge transistor until a potential of the cells exceeds the predetermined first low voltage level. Partially enabling the charge transistor can include adjusting a potential across the charge transistor to be higher than a difference between a potential of the cells and a minimum operating voltage required to power battery system monitor circuitry of the battery system. Partially enabling the charge transistor can also include adjusting a potential across the charge transistor so the voltage seen by the charger is lower than a voltage level where the charger will switch from a reduced charge rate to a normal charge rate.

The battery system can includes a battery management system including battery monitoring circuitry and where adjusting a voltage applied to the charge transistor includes adjusting a drive signal to the charge transistor to maintain a voltage seen at an input to the battery management system at a level higher than a difference between a potential of the cells and a minimum operating voltage for the battery management system. The battery system can include a battery management system including battery monitoring circuitry and where adjusting a voltage applied to the charge transistor includes adjusting a drive signal to the charge transistor to maintain a voltage seen at an input to the battery management system lower than the voltage level where the charger will switch from a reduced charge rate to a normal charge rate for the battery management system.

The method can further include enabling monitoring circuitry in the battery system prior to charging the cells at a reduced rate and monitoring the reduced rate charging of the cells. The method can further include safety monitoring the battery system while charging as well as monitoring the change in the capacity of the cells of the battery system while charging.

Adjusting a voltage applied to the charge transistor can include determining if an operating potential of the battery system is above a predefined maximum, and if so, increasing a drive voltage presented to the charge transistor. Additionally, adjusting a voltage applied to the charge transistor can include determining if an operating potential of the battery system is below a predefined minimum, and if so, decreasing a drive voltage presented to the charge transistor.

In general, in one aspect, a method for charging a battery system is provided. The method includes enabling determining if a charger is coupled to a battery system, the battery system including one or more cells, a charge enable transistor, and charge monitor control circuitry. The method also includes enabling determining if a voltage level of the cells is less than a predetermined first low voltage level. If the voltage level of the cells is less than the predetermined first low voltage level, the method includes enabling charging the cells at a reduced rate including partially enabling the charge transistor. When the voltage of the cells reaches the predetermined first low voltage level, the method includes substantially fully enabling the charge transistor to allow for charging at full rate by the charger. Partially enabling the charge transistor can include regulating a voltage seen by the charger to a level that is less than a predetermined second voltage level.

In general, in another aspect, a method for charging a battery system is provided. The method includes enabling determining if a charger is coupled to a battery system through a charge transistor. The method also includes enabling a charge transistor to a partially enabled state while one or more cells of a battery system are at a voltage that is less than a predetermined first threshold to allow for reduced rate charging. Additionally, the method includes enabling the charge transistor to a fully enabled state if the determined voltage level is at or above the predetermined first threshold to allow for full rate charging.

In general, in one aspect, a method is provided. The method includes enabling determining that a charger has been coupled to a battery system. The battery system includes one or more cells, monitoring circuitry for monitoring a charge level of the one or more cells, a charge transistor for enabling the charging of the one or more cells, and a drive circuit for driving the charge transistor gate terminal. The method also includes monitoring the one or more cells voltage level and determining if the monitored voltage level is below a first threshold voltage level. If the monitored voltage level is below the first threshold voltage level, the method includes enabling charging the cells at a reduced rate including partially enabling the charge transistor gate terminal. When the monitored voltage exceeds the first threshold voltage level, the method includes substantially completely enabling the charge transistor. Enabling charging at a reduced rate can include regulating a voltage seen by the charger.

In general, in one aspect, a battery management system is provided. The system includes a monitor operable to detect a voltage level of one or more cells of a battery pack. The system also includes a drive circuit operable to drive a charge transistor in one of at least three modes. The drive circuit is operable to drive the charge transistor in a first low-voltage mode including partially enabling the charge transistor to regulate the voltage seen by an external charger, drive the charge transistor in a second off mode, to disable charging and drive the charge transistor in a third on mode, to enable full charging.

In general, in another aspect, an apparatus is provided. The apparatus includes a high-side NFET charge transistor, a drive circuit for driving the high side NFET charge transistor, and a monitor circuit for monitoring a voltage level of a battery cell to be charged. The drive circuit of the apparatus is operable to partially enable the high side NFET charge transistor if the voltage level of the battery cell is below a first threshold level while in the presence of a charger.

In general, in one aspect, an apparatus is provided. The apparatus includes a drive circuit for driving a charge transistor of a battery pack and a monitor circuit for monitoring a voltage level of a battery cell to be charged. The drive circuit is operable to partially enable the charge transistor if the voltage level of the battery cell is below a first threshold level while in the presence of a charger.

In general, in one aspect, a method is provided. The method includes monitoring a voltage level of cells associated with a battery pack to determine if the monitored voltage level is below a first threshold voltage level. The method also includes enabling determining if a charger is coupled to the battery pack and regulating a potential seen by the charger until a potential of the cells exceeds the first threshold level.

Aspects of the invention can include one or more of the following features. A battery charge system is proposed that allows the monitoring of the charge process over an entire charge cycle. To do so, charge monitor circuitry can be powered and enabled prior to initiation of charge, even when recovering from a deep under-voltage condition. Further, in a charge cycle from a deep under-voltage condition, a charge transistor can be turned on partially for particular battery configurations. The partial charge mode can be maintained until the potential of the cell(s) rises to a sufficient level so as to allow the safe charging of the cells in a rapid or normal charge mode.

In the proposed system, when a charger is connected to a battery management system, a charge transistor is partially enabled. Partial enablement allows for the regulation of the voltage level seen by the charger (i.e., at a level below a rapid/normal mode level) to prevent the charger from switching modes. In the proposed system this is accomplished while maintaining a supply voltage to the battery management system components (e.g., the integrated circuit components including microcontroller (e.g., chip or chips)) above a minimum operating level. By maintaining the operating voltage of the battery management system components, monitoring functions can be enabled during the entire charge cycle (e.g., to ensure monitoring from deep under-voltage recovery as well as accurately monitoring the charge loaded into the cell(s)).

In one implementation, a proposed system allows for deep under-voltage recovery with high-side NFET transistors, such being more cost effective and able to be produced in a cost effective high-voltage CMOS process. Further, NFETs have smaller on-resistance than similarly sized PFETs. Accordingly, the proposed system including high-side NFET transistors can be implemented with cheaper and or fewer transistors.

The proposed high-side solution as well is advantageous over conventional low-side solutions. Conventional drivers for low-side FET solutions are not easily implemented in CMOS because output voltages significantly lower than ground are required in order to disable the FETs. Conventional battery packs with low-side FETs require Bipolar or BiCMOS technologies. One proposed solution includes a fully integrated high-side solution where the high-voltage front-end components, microcontroller and non-volatile memory are integrated into a single chip. Compared to a fully integrated CMOS solution, a bipolar solution does not enable a cost efficient integration of a microcontroller unit and non-volatile memory. BiCMOS technology is significantly more expensive to execute.

Similarly, a proposed battery management system that includes a communication port can be readily implemented in a high-side solution without difficulties presented by low-side solutions associated with the communication signal levels and the ground of the battery management system. However, if a low-side solution is still desirable, teachings described herein relating to partial enablement of the charge transistor may still provide advantages as disclosed. Further, though an NFET solution is described, partial enablement of the charge transistor can be used in PFET solutions as well.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Reference will be made to a one-chip battery management system where a microcontroller, non-volatile memory and other circuit components are integrated in single integrated circuit. Alternatively, the proposed methods and systems can be realized in a multi-chip solution. The methods and systems disclosed can be implemented in these and other architectures as would be understood by those of ordinary skill in the art. A method, apparatus and system are described for deep under-voltage recovery (i.e., very low cell voltages) in a manner which ensures that proper power is supplied to the battery management system circuit elements (e.g., proper supply is provided to the battery management system so that monitoring functions can be enabled) while similarly ensuring that an associated charger is properly configured to charge cell(s) of the system including during deep under-voltage recovery.

Battery Pack Including Battery Management System

Figure 1A:
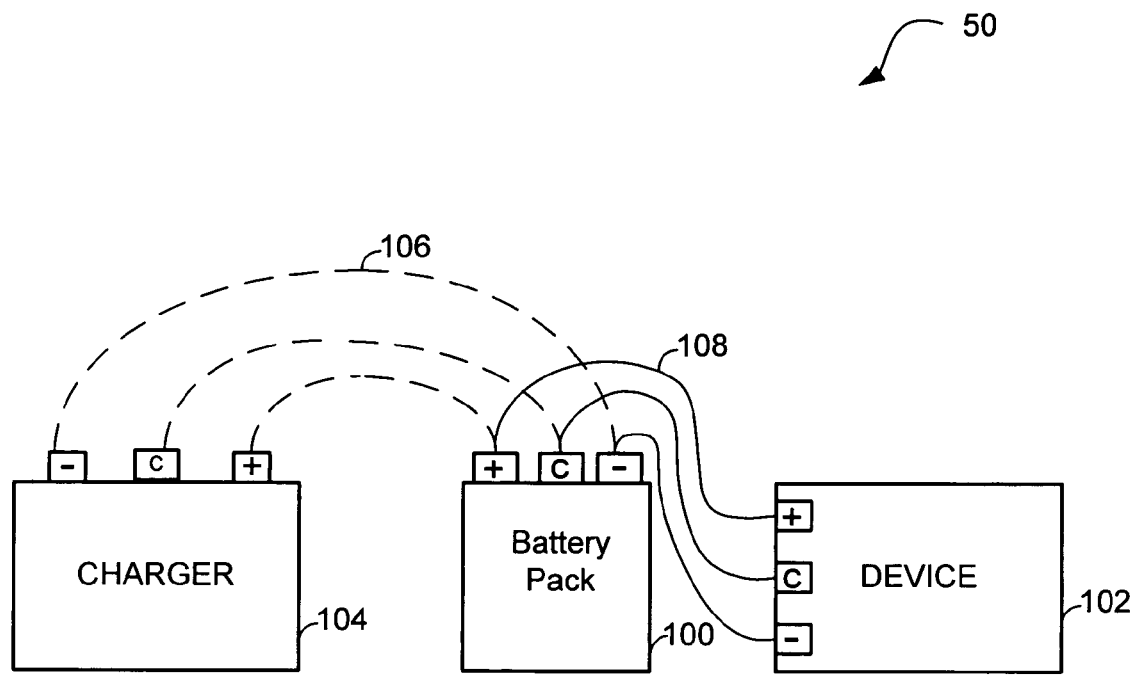
FIG. 1A is a schematic diagram of an application including a battery pack.

Referring now to FIG. 1A, a battery pack 100 for use in an application 50 is shown. Battery pack 100 can be coupled to either a device 102 or a charger 104. When coupled to the charger 104, terminals (i.e., positive and negative and optionally a communication terminal) of the battery pack 100 are coupled by a medium 106 to corresponding terminals (i.e., positive and negative and communication terminals) of the charger 104 to allow for the charging of cell(s) associated with the battery pack 100. Medium 106 can be of the form of wires, leads, pins, or other means of electrical connection. Charging is discussed in greater detail below.

Similarly, when coupled to a device 102, terminals (i.e., positive and negative and communication terminals) of the battery pack 100 are coupled by a medium 108 to corresponding terminals (i.e., positive and negative and communication terminals) of the device 102 to allow for the operation of the device 102. Medium 108 can be of the form of wires, leads, pins, or other means of electrical connection. In some implementations, battery pack 100 is also coupled to device 102 and charger 104 at respective communication ports. Communication ports allow for the transfer of information (e.g., command and control) between the device 102/charger 104 and battery pack 100. One example of information that can be exchanged includes the battery charge level (i.e., capacity).

Figure 1B:
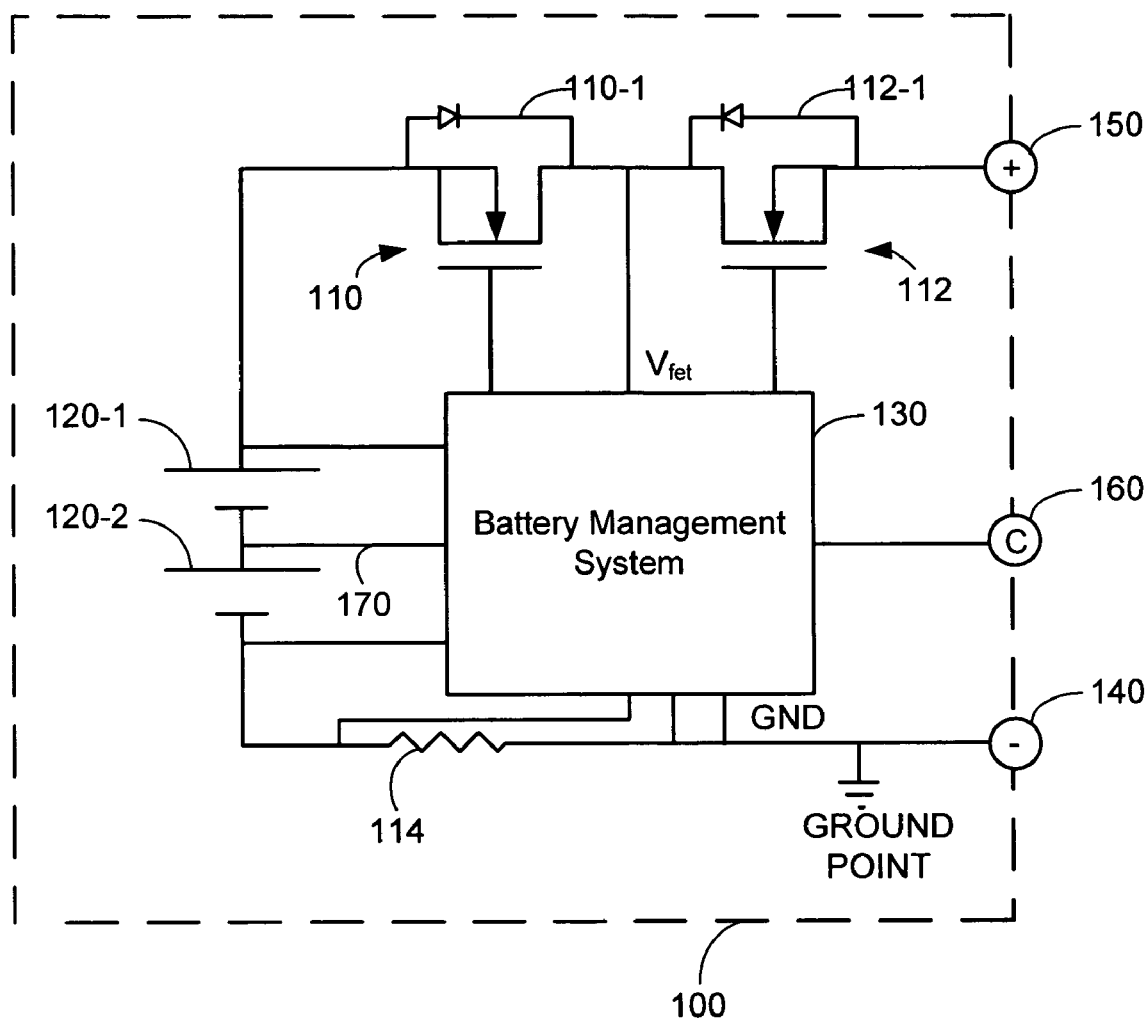
FIG. 1B is a schematic diagram of a battery pack.

Referring now to FIG 1B, a more detailed schematic diagram is provided for battery pack 100. Battery pack 100 includes one or more battery cells 120, discrete transistors 110,112, a shunt resistor 114, and a battery management system 130. Battery management system 130 includes plural components, as discussed below, which can be integrated in a single package (e.g., integrated into a single integrated circuit). Alternatively, battery management system 130 components can be packaged separately. Discrete transistors 110, 112 can be separate from battery management system 130 and included in a separate package or can be packaged together with the battery management system 130 components.

Discrete transistors 110, 112 are used to disconnect the battery cells 120 from the external battery pack terminals (external battery pack positive terminal 140 and negative terminal 150). In the implementation shown, two discrete transistors are shown which can be of the form of Field Effect Transistors (FETs). While other transistor technologies can be used, FETs present advantages in terms of process, performance (e.g., on-resistance), cost, size etc. In the implementation shown, two transistors are provided and represent separate charge 110 and discharge 112 transistors. Charge transistor 110 is used to enable safe charging of the battery cells 120. Discharge transistor 112 is used to enable safe discharging of the battery cells 120. The charge and discharge transistors 110,112 are coupled in series. In one implementation, two NFET transistors are used and are coupled drain-drain in a series configuration. Alternatively, two PFET transistors could be used and be coupled source-source. In a PFET solution additional diodes not shown may be required to provide power to the battery management system 130 (i.e., to feed $V_{fet}$).

In the implementation shown, the charge and discharge transistors 110, 112 are coupled in a high-side configuration (i.e., the series transistors are coupled to the high side of the battery cells as opposed to a low-side configuration). In the high-side configuration shown, one terminal of the charge transistor 110 (a source in a NFET implementation) is coupled to the positive terminal of the battery cell 120-1. One terminal of discharge transistor 112 (also a source in a NFET implementation) is coupled to the external battery pack positive terminal 150. Respective second terminals of the charge and discharge transistors 110, 112 are coupled to each other (forming a drain-drain junction in a NFET implementation). Gates of charge transistor 110 and discharge transistor 112 are coupled to battery management system 130 at inputs OC and OD, respectively. Similarly, the junction between the transistors 110, 112 is coupled to the battery management system 130 at a chip input (or sometimes referred to herein and labeled in FIG. 1B as $V_{fet}$). The chip input provides operational power to the battery management system 130.

In the implementation shown, two transistors are required to be able to block the current flow in both directions. More specifically, FETs include a parasitic diode (labeled 110-1 and 112-1, respectively) and accordingly having a single FET would not allow for the disabling of current flow in both directions. When two FETs are used in series (either source to source, or drain to drain), current flow into and out of the battery cells can be disabled. Similarly, when two transistors are used, selective control can be exercised to allow current flow in only a single direction at a given time (i.e., charge is allowed, but discharge is not until sufficient charge has been placed into the battery cells).

Battery cells 120 are rechargeable batteries and can be of the form of lithium ion (Li-ion) or lithium polymer (Li-polymer). Other battery technology types are possible. Where plural cells are provided, the battery cells 120 are coupled in series. In the two-cell implementation shown, a top-most positive terminal of battery cell 120-1 is coupled to the battery management system 130 (e.g., to allow for the detection of the battery voltage level) and to one of the discrete transistors (i.e., the charge transistor 110). The negative terminal of the top most battery cell 120-1 and the positive terminal of the bottom most battery cell 120-2 are coupled together and to the battery management system 130 at input 170. The negative terminal of the bottom most battery cell 120-2 in the series is coupled to the battery management system 130 (e.g., to allow for the detection of the battery voltage level) and to one terminal of the shunt resistor 114. Though a two battery cell implementation is shown, other numbers of battery cells can be included in the battery pack 100, including a single cell configuration or other multiple cell configurations. The second terminal of the shunt resistor is coupled to local ground (smart battery local ground), the battery management system 130 (to allow for the measurement of current flow through the shunt resistor 114) and to the external battery pack negative terminal 140 of the battery pack 100.

Battery management system 130 includes supervisor electronics to protect the battery pack in case of incorrect operation, monitoring electronics to estimate remaining battery capacity, a controller (e.g., a micro-controller) for system control and communication with the device and/or the charger coupled to the battery pack, and memory (e.g., EEPROM, Flash ROM, EPROM, RAM etc.). As discussed above certain battery technologies can create dangerous conditions if improperly used. For example, Li-ion and Li-polymer batteries can overheat, explode or self-ignite if they are overcharged or discharged too rapidly. Further, Li-ion and Li-polymer batteries can lose a significant amount of their charge capacity if they are too deeply discharged. Battery management system 130 includes supervisory electronics to ensure fault free operation, at least one of which is recovery from a deep under-voltage condition. Deep under-voltage recovery is discussed in greater detail below.

Monitoring electronics that are part of battery management system 130 can be used to estimate remaining battery capacity. Battery capacity information can be communicated between the battery management system 130 and a connected device/charger through a communications port terminal 160. As will be discussed in greater detail below, a microcontroller (and associated memory) can be included within battery management system 130 and can provide system control and communication with a connected device/charger.

Battery Management System

Figure 2:
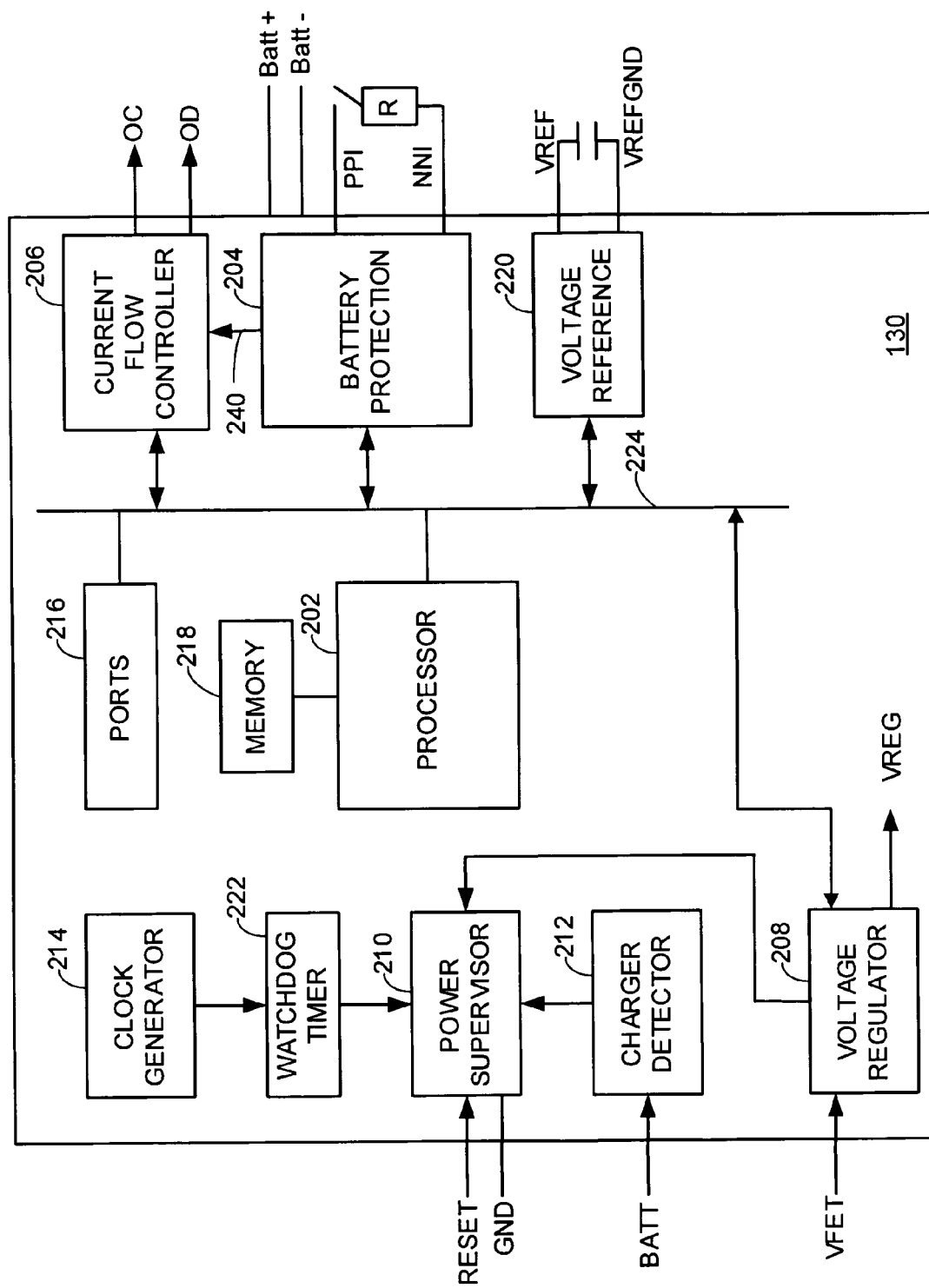
FIG. 2 is a block diagram of a battery management system.

FIG. 2 shows a block diagram of an exemplary battery management system 130 used in the battery pack 100. The battery management system 130 generally includes a processor 202 (e.g., a low-power, CMOS 8-bit microcontroller based on a RISC architecture), a battery protection circuit 204, a current flow controller 206, power supervisor 210, charge detector 212, clock generator 214, ports 216, memory 218, voltage reference 220 and watchdog timer 222. The processor 202, ports 216, battery protection circuit 204 and voltage reference 220 are each coupled to a data bus 224.

A practical implementation of the battery management system 130 can include other components and subsystems, which have been removed from FIG. 2 for clarity purposes. For example, the chip 130 can include circuitry for battery monitoring (e.g., analog-to-digital converters), cell balancing circuitry (e.g., cell balancing FETs) for balancing cell voltages, a communications device for communicating with an external device, noise suppression circuitry, wake-up timer, and other monitor or control circuitry.

The memory 218 can be programmed with instructions that can be executed by the processor 202 to perform various tasks, such as cell balancing, battery protection, current measurements for determining charge level, etc.

In some implementations, the current flow controller 206 has several outputs (e.g., OC, OD) which are coupled to external devices that can be configured by the current flow controller 206 to control the current flow between the battery cells and a device or charger. The current flow controller 206 includes various circuits and logic (e.g., operational amplifiers, control and status registers, transistors, capacitors, diodes, inverters, gates, etc.) for generating voltages at the outputs (e.g., OC and OD). In some implementations, the OC output is a high voltage output that is coupled to the gate of a charge FET (e.g., charge transistor 110) to completely or partially enable or disable the charge FET to control current flow during a charging event. The OD output is a high voltage output that is coupled to the gate of a discharge FET (e.g., discharge transistor 112) to completely or partially enable or disable the discharge FET to control current flow during a discharging event. FIG. 1B shows an exemplary configuration of FET devices in a high-side implementation for controlling current flow in response to control voltages from the current flow controller 206.

The current flow controller 206 is coupled to the battery protection circuit 204 through interface 240. The battery protection circuit 204 includes circuitry (e.g., a differential amplifier) for monitoring the battery cell voltage and charge/discharge currents to detect fault conditions, and to initiate actions (e.g., disabling or partially disabling charge and discharge FETs) to protect the battery pack 100 from being damaged. Examples of fault conditions include but are not limited to: deep under-voltage during discharging, short-circuit during discharging and over-current during charging and discharging. In some implementations, a current sense resistor ($R_{sense}$, i.e., shunt resistor 114) can be coupled across the PPI and NNI inputs of the battery protection circuit 204, where PPI is an unfiltered positive input from the current sense resistor and the NNI is an unfiltered negative input from the current sense resistor. The current sense resistor can be coupled to the battery cells 120 and battery management system 130, as described with respect to FIG. 1B.

Gate Driver including Deep Under-Voltage Recovery Circuitry

Figure 3:
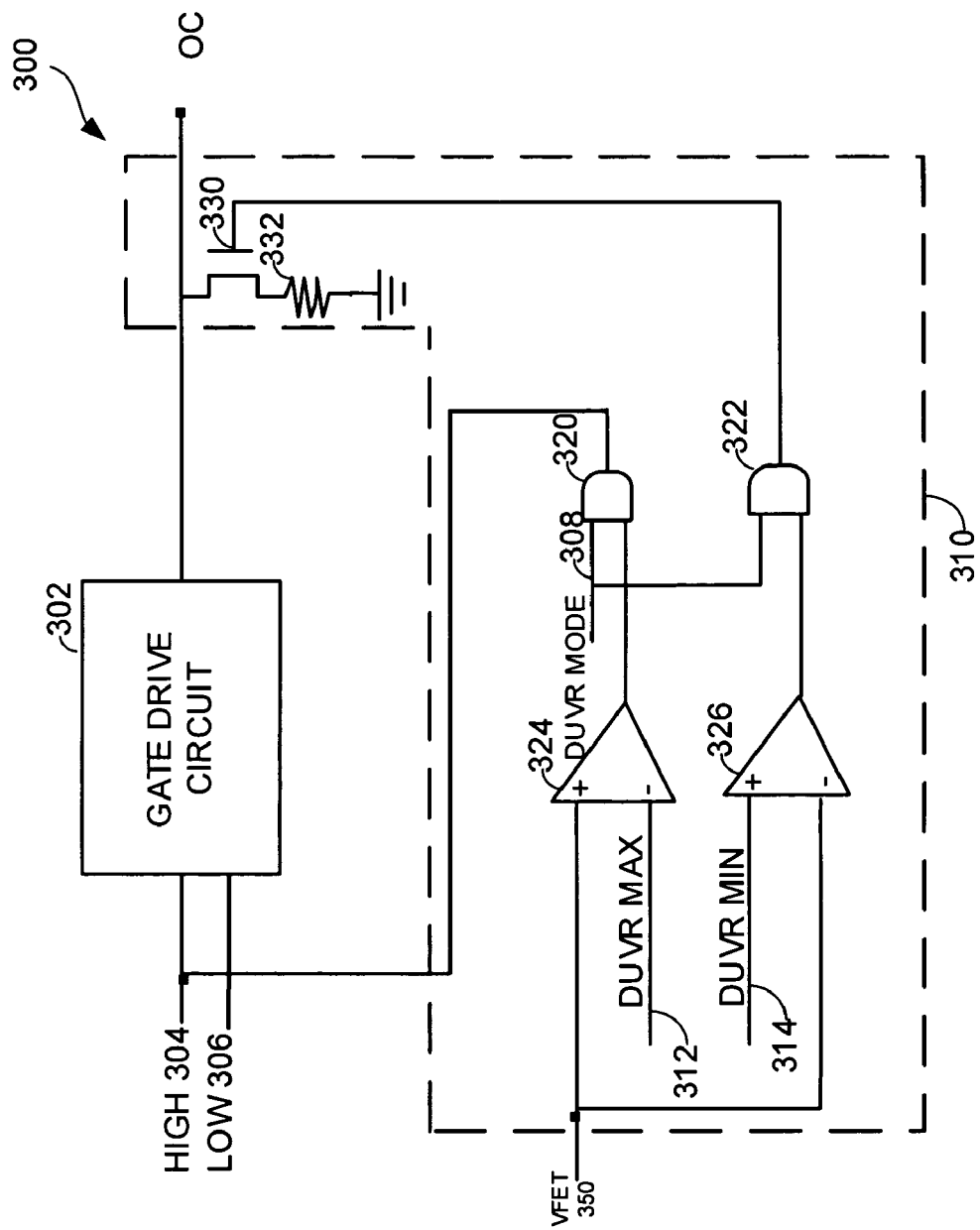
FIG. 3 is a block diagram of a drive circuit for driving a charge transistor.

Referring now to FIG. 3, a drive circuit 300 associated with the charge transistor (OC FET) in the high-voltage front end of the battery pack 100 is shown. Drive circuit 300 forms part of the current flow controller 206 of FIG. 2 and includes gate driver 302, high and low enable signals 304 and 306 respectively, deep under voltage recovery mode signal 308, recovery circuit 310 and two reference signals labeled DUVR maximum and DUVR minimum 312, 314 respectively.

Gate driver 302 includes plural inputs, including high and low enable signal inputs 304 and 306, respectively. Gate driver 302 also receives as an input an output signal (e.g., an output of AND gate 320) of recovery circuit 310. Gate driver 302 includes a charge pump (not shown) that is used to provide the drive signal to the gate of the charge transistor 110 of FIG. 1. The output signal labeled OC is coupled to the gate input of the charge transistor 110. As will be discussed in greater detail below, the gate driver can be configured in one of three modes: high mode, low mode or partially enabled mode. In high mode, the gate of the charge transistor is substantially fully enabled by the drive signal provided by the gate driver 302 (i.e., responsive to high enable signal 304). In low mode, the gate of the charge transistor is substantially fully disabled by the drive signal provided by the gate driver 302 (i.e., responsive to the low enable signal 306). In partially enabled mode, the gate of the charge transistor is driven to adjust the potential across (i.e., across the drain-source junction of) the charge transistor and thereby regulate the potential seen both by the charger and at the input to the battery pack (i.e., $V_{fet}$). In partially enabled mode, the drive signal provided to the gate of the charge transistor can be alternatively pumped up (e.g., by the charge pump in the gate driver) to increase the gate drive signal so as to further enable the charge transistor or decreased (e.g., by switching switch 330 and allowing discharge through resistor 332) for a predetermined number of cycles. In partial enable mode, gate driver 302 maintains the potential seen by the charger (i.e., regulates $V_{fet}$ 405) to a level that is substantially constant and within the band defined by the DUVR maximum and minimum reference signals (e.g., DUVR maximum and DUVR minimum 312, 314).

One of ordinary skill in the art will recognize that the partial enablement of the gate drive signal of the charge transistor as described above (including pumping of the charge pump of the gate driver 302, and discharge with switch 330) is merely exemplary. Partial enablement of the charge transistor can be accomplished by various means. One implementation for a system for partially enabling the charge transistor is shown in conjunction with FIG. 3. Alternatively, other configurations are possible. For example, a partial enable signal including drive details (i.e., a signal that is varied at a level of the amount the gate is to be driven) could be provided to the gate driver 302 as an input. In response to the partial enable signal, the gate of the charge transistor could be driven at the level (i.e., partial level) indicated in the partial enable signal. Alternatively, a step function could be used by the gate driver, with the partial enable signal merely signaling when to step (up or down) to a next level. Details of the partial enabling of the gate driver 302 are discussed in greater detail below in association with the recovery circuit 310 and also in association with the charge process discussed in FIG. 5.

Recovery circuit 310 includes circuitry for deep under-voltage recovery. Recovery circuit 310 can be used to control, in one implementation, the partial enabling of the gate driver 302. In one implementation, recovery circuit 310 includes combinational logic, two comparators and a switch. Specifically, in the implementation shown, recovery circuit 310 includes two AND gates 320, 322, two comparators 324, 326 and switch 330.

One input to each of AND gates 320, 322 is provided by DUVR mode signal 308. DUVR mode signal 308 is a deep under-voltage mode signal that can be provided, for example, by microcontroller 220 of FIG. 2. DUVR mode signal 308 is enabled when the battery pack is in deep under voltage recovery (e.g., when the cells have been deeply discharged and need special charging prior to normal charge operations). DUVR mode signal 308 can be generated in response to a comparison of the cell(s) potential level to a minimum potential level. Cell voltage levels can be measured directly by, for example, a monitor in the battery management system 130. A second input signal to AND gate 320 is coupled to the output of comparator 324. The second input signal to AND gate 322 is coupled to the output of comparator 326.

As described above, an output of AND gate 320 is coupled to a high enable input of gate driver 302. An output of AND gate 322 is coupled to a gate of switch 330. Switch 330 can be of the form of a transistor and the output of AND gate 322 can be used to drive the gate of the transistor 330 as is shown in FIG. 3. In the configuration shown, a signal path between the switch 330 and a ground point for the battery management system 130 can optionally include a discharge resistor 332. By completely switching switch 330 (e.g., driving the gate to substantially completely enable the transistor) the output signal delivered by the drive circuit 300 to the charge transistor can be reduced (hence partially disabling the charge transistor). The operation of the switch and resistor 332, along with the gate driver 302, will be discussed in greater detail below.

One input to each of comparators 324, 326 is provided by an input signal 350. More specifically, the first ("+" or non-inverting) input to comparator 324 is coupled to input signal 350. Similarly, a second ("−" or inverting) input of comparator 326 is coupled to the input signal 350. Input signal 350, referred to herein as either the chip input or $V_{fet}$, is the operating potential signal for the battery management system 130. Input signal 350 represents substantially the potential seen at a node between the series transistors (e.g., potential at the node between the drains of the charge OC and discharge OD transistors in a NFET high-side solution). In some systems this is referred to as the chip input, input voltage, $V_{fet}$ or $V_{cc}$ for the battery management system 130.

A second input ("−" or inverting input) to comparator 324 is provided by the DUVR maximum reference signal 312. A first input ("+" or non-inverting input) to comparator 326 is provided by the DUVR minimum reference signal 314. In one implementation, the DUV minimum reference signal is set to be at substantially a lowest operating point for the battery management system 130 (e.g., $V_{fet}$ is at its minimum for normal battery management system 130 operation). In one single cell implementation, the DUVR minimum reference signal level is substantially 0.9× volts, where x is a real number multiplier. In one multiple cell implementation, the DUVR minimum reference signal level is substantially 1.8× volts. Similarly, in one implementation, the DUV maximum threshold level is set to be just below the transition level associated with a mode transition from pre-charge to rapid or normal charge mode in the charger (i.e., just below the pre-charge threshold level). In one single cell implementation, the DUVR maximum reference signal level is substantially 1.1× volts. In one multiple cell implementation, the DUVR maximum reference signal level is substantially 2.0× volts.

Operation

Figure 4:
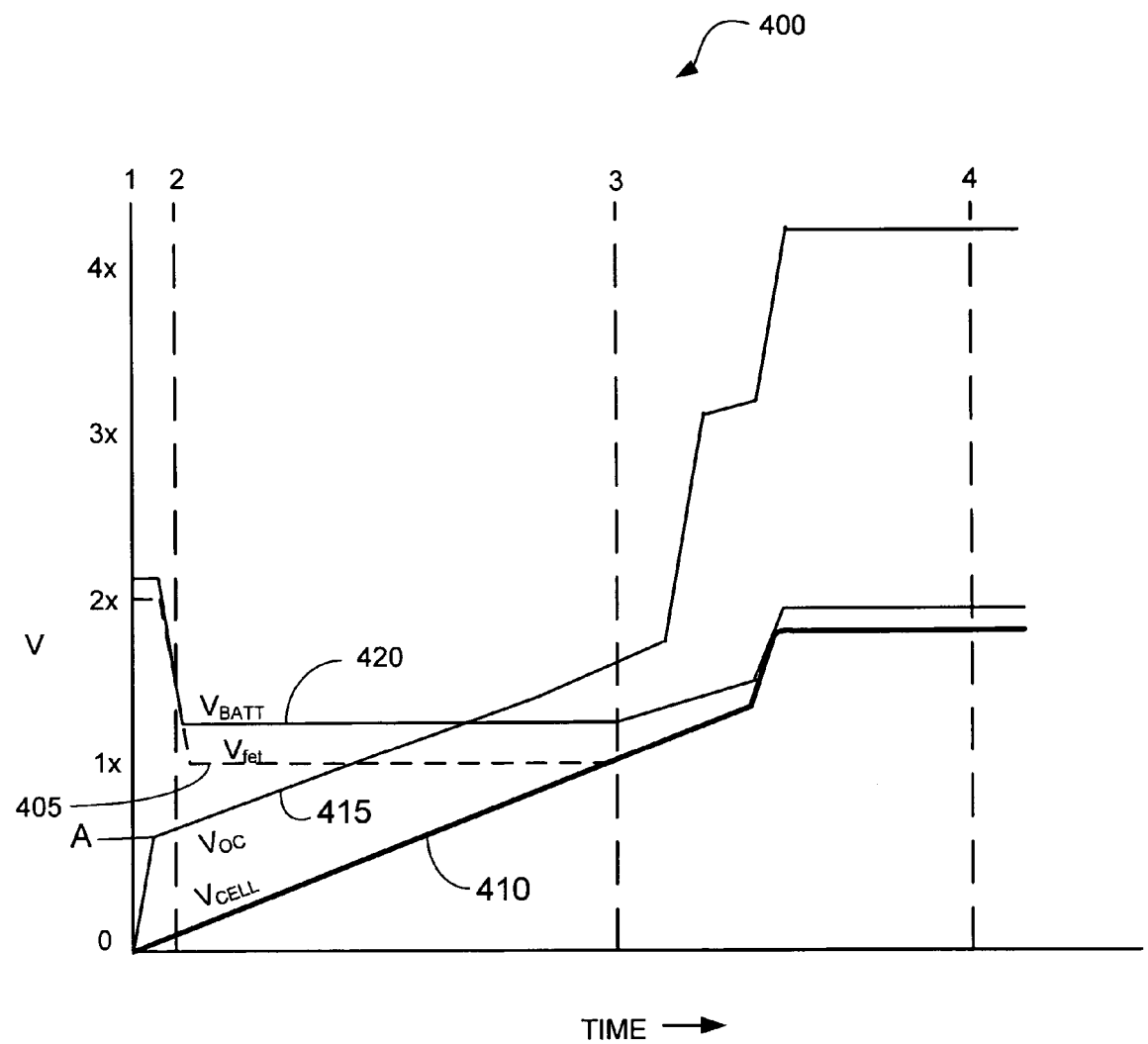
FIG. 4 is a graph showing the partial charge and conventional charge mode including the relationship between the input potential at the battery management system and the drive potential for the charge transistor.

Reference now will be made to the operation of gate driver 302 and recovery circuit 310 in association with the charge graph shown in FIG. 4. Charge graph 400 includes an X-axis (time) and Y-Axis (potential) and shows the state of various signals (input potential to battery management system $V_{fet}$ 405, cell potential $V_{CELL}$ 410, drive signal to charge transistor $V_{OC}$ 415, and potential seen by the charger $V_{BATT}$ 420 (i.e., potential seen at battery pack "+" terminal)) associated with the drive circuit. Four time periods are shown characterized by reset (time 1), charger connection and inrush (time period 1 to 2), partial charge (time period 2-3) and conventional charging (time period 3-4).

At time t=0 (substantially coincident with time 1), the battery pack is in reset mode, having no charger coupled to the device and having substantially 0 potential of the associated battery cells (i.e., $V_{CELL}$ is substantially zero and the cells are in a deep-under voltage condition).

At time t≧0 (characterized by time period 1 to 2), a charger is coupled to the battery pack. The coupling of the charger to the battery pack results in a sharp rise of the gate driver voltage $V_{OC}$ (as seen in drive signal $V_{OC}$ 415) to an initial level (shown at point A on the graph). In order to charge the battery, the charge transistor must be at least partially enabled to allow charge to flow into the battery (hence the rise in the $V_{OC}$ potential). Substantially coincident with the rise in the gate driver voltage $V_{OC}$ is a decrease in the potential seen at the input to the battery management system 130 input $V_{FET}$ 405 and the battery potential seen by the charger $V_{BATT}$ 420. At substantially time 2, the microcontroller associated with the battery management system 130 has detected the deep under-voltage condition and initiated a deep under-voltage recovery that includes the partial enablement of the charge transistor as will be discussed below.

Referring now to the partial charge time period (characterized by time period 2 to 3), a deep under-voltage recovery mode has been triggered. Deep under-voltage recovery can be triggered as discussed above by the detection of a voltage level of the cell(s) that is less than a threshold level. In one single cell implementation, deep under-voltage recovery is triggered if the cell voltage level at the time for charging is less than approximately 1.0× volts. In one implementation, deep under-voltage recovery mode is the default start mode for charging the battery pack. In deep under-voltage recovery mode, the drive signal provided to the gate of the charge transistor $V_{OC}$ 415 is adjusted such that the potential seen at the input to the battery management system 130 $V_{fet}$ 405 is substantially regulated at a level (e.g., at a level above the minimum operating level) over the entire time period associated with the deep under-voltage recovery (time period 2 to 3). As can be seen in FIG. 4, $V_{fet}$ 405 is maintained at a substantially constant level over the entire partial charge time period.

In the deep under-voltage recovery mode, charging is allowed by the partial enabling of the charge transistor by, for example, the combination of gate driver 302 and recovery circuit 310 described above, but the amount of charge is carefully controlled. As can be seen in the charge graph, the potential of the cells ($V_{CELL}$ 410) rises as charge is added. As charging continues, the gate drive potential of the charge transistor ($V_{OC}$ 415) is adjusted toward complete enabling (to turn on the transistor more and reduce the potential drop across the drain-source junction of the charge transistor). In one implementation, adjustment includes the enabling of a charge pump in the gate driver (i.e., gate driver 302) for a predetermined number of cycles (e.g., one). This coincident adjustment reduces the drain-to-source potential across the charge transistor and results in a substantially constant (i.e., regulated) potential at the input to the battery management system 130 (i.e., substantially constant $V_{fet}$ signal trace over period 2-3). For example, in a deep under-voltage recovery where the cells have an initial voltage of 0.5 volt, and the minimum operating potential of the battery management system 130 is 1.0× volts, the charge transistor may initially be partially enabled so that the drain-source junction realizes a potential that is the difference between the cell potential and the minimum operating potential (here 0.7× volts initially). As charge flows into the battery cells, and as the battery cells potential rises, the drive signal provided to the gate of the charge transistor is further adjusted (in this case increased (e.g., by pumping the charge pump in the gate driver a predetermined number of times) so as to lower the resistance across the drain-source junction thereby reducing the potential across the transistor) so as to maintain the operating potential presented to the battery management system 130 $V_{fet}$ 405 at substantially above a constant minimum operating level. Note, if the adjustment of the gate drive signal is too much (e.g., the charge pump is cycled too many times and the resultant $V_{fet}$ operating level drops too low), then the gate drive signal can be reduced (e.g., by switching transistor 330 and allowing for the discharge of the transistor though resistance 332) for an amount of time or number of cycles so as to raise the operating potential of $V_{fet}$ 405.

As the voltage of the cells continues to rise, the deep under-voltage recovery mode can be terminated (start of time period 3-4). At termination, conventional charging can commence including the complete enabling of the charge transistor 110 of the battery pack.

Deep Under-Voltage Recovery Method

Figures 5A, 5B:
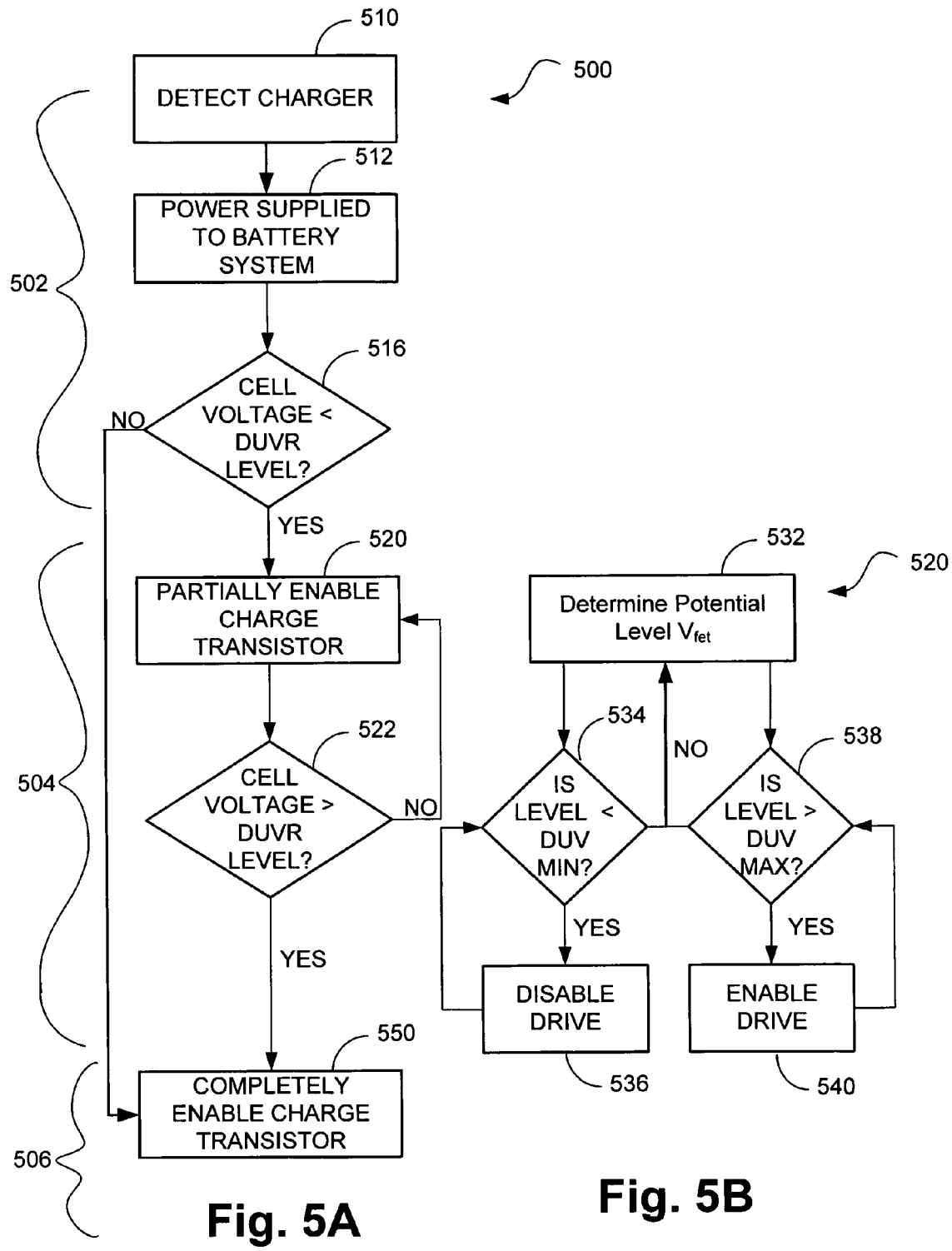
FIG. 5A is a flow diagram for a deep under-voltage recovery method.
FIG. 5B is a flow diagram for a partial charge mode.

Referring now to FIG. 5A, a flow diagram for a method 500 for deep under-voltage recovery is provided. Recovery method 500 includes three stages, a set-up phase 502, a partial charge phase 504 and a charge phase 506.

In the set-up phase 502, a charger is detected as being coupled to a battery pack 510. The detection can include detection through a parasitic diode in a discharge transistor or alternatively, separate detection not associated with the discharge transistor of the battery pack (e.g., by a charger detection circuit in the battery management system 130). After detection, the battery management system is powered, being provided with power at a sufficient operational level either from the associated battery cell(s) or the charger 512. More specifically, in a high-side NFET configuration, the battery management system is powered at an input (referred to here as the chip input or $V_{fet}$) by the parasitic diodes present in the charge and discharge transistors to a highest potential level as between the cell(s) potential and the charger potential. The powering of the battery management system by one of the cell(s) or the charger prior to charging allows for the accurate measurement of charge input to the cells (along with temperature and other data gathering) and complete control of the charging cycle (i.e., including the enabling of the various protection modes of the battery management system). A potential level of the cell(s) in the battery pack is detected. If the potential level is below a threshold level (referred to herein as the partial charge voltage level) 516, a deep under-voltage recovery is initiated and the process continues at step 520. Alternatively, whenever the battery pack is coupled to a charger, a deep under voltage recovery mode can be initiated. If the voltage level of the cell(s) is above the threshold level, a conventional charge cycle is initiated at step 550. In a conventional charge cycle (550), the charge transistor of the battery pack is completely enabled to allow for the conventional or rapid charge of the cell(s). In some implementations, the discharge transistor can be disabled during the charge cycle. Disabling the discharge transistor prevents the battery pack from being disconnected from the charger and connected to a device prior to the complete or otherwise sufficient charge of the cell(s). In other implementations, the discharge transistor of the battery pack is enabled during the charge cycle.

In the partial charge phase 504, the charger is allowed to charge the cell(s) but in a low-rate mode. In order to maintain the charger in the low-rate mode the voltage seen by the charger must be regulated. As discussed above, conventional chargers that have two modes of operation (i.e., pre-charge and normal or rapid charge), switch operational modes based on the voltage level seen by the charger (interpreting this to be the cell(s) voltage level). However, some particular battery technologies cannot be charged too rapidly from a deep under-voltage condition. To prevent a conventional charger from switching pre-maturely into normal or rapid mode, the voltage presented to the battery management system (i.e., $V_{fet}$), and hence to the charger, is regulated (i.e., $V_{fet}$ has a known relationship to the voltage seen by the charger, and accordingly, can be regulated to ensure proper charger operation). More specifically, during partial charge mode, the drive signal provided to the charge transistor is adjusted so that the drain-source potential level of the charge transistor is equal to the potential difference between the cell potential and the required battery management system operating potential (or at a level above such minimum level). As the potential level of the cell(s) rise, the potential across the drain-source junction of the charge transistor is adjusted (i.e., drops) to maintain (i.e., regulate) the battery management system input at substantially the correct operating potential. This continues until the potential level of the cell(s) reaches a recovery voltage, at which point in time the deep under-voltage mode (and the associated partial charge mode) can be terminated.

Returning to FIG. 5A, in partial charge phase 504 the charge transistor is partially enabled to allow the charging of the cell(s) 520. Partial charging can be performed by providing a gate drive signal to the charge transistor that is less than a level required to completely enable the transistor. Alternatively, a series of steps can be executed to facilitate partial charge. In another implementation, the gate driver of the charge transistor can be alternately turned on (e.g., pumped up) and off (e.g., discharged through switch 330 and resistor 332) based on comparisons made between the input potential to the battery management system and one or more reference signals (i.e., comparing the input potential to high and low reference signals DUVR maximum and DUVR minimum 312, 314 to create an operating band for the charge transistor). Partial charge continues until the cell(s) potential rise above the partial charge voltage level 522. Thereafter, partial charge phase 504 terminates and normal or conventional charging ensues 550. More particularly, as discussed above in one implementation, during partial charge mode a drive signal to the charge transistor is adjusted so that the drain-source potential level of the charge transistor is equal to the potential difference between the cell(s) potential and the required battery management system operating potential.

One implementation for controlling the partial charge is shown in FIG. 5B (specifically, with reference to steps 532-540). In this implementation, a drive signal to the gate of the charge transistor is adjusted over an operational band. Logic can be used to maintain the drive signal in the desired band. As the potential seen at the input to the battery management system adjusts (due to the increased potential of the battery cells during charge), the amount that the charge transistor is turned on is also adjusted. By turning the charge transistor more on or off, the resistance across the source-drain junction changes, producing a change in the potential seen at the input to the battery management system. More specifically, a determination is made as to the potential level at the battery management system input 532. If the potential level is below a minimum DUV threshold level 534, then the drive circuit associated with the charge transistor is switched to be disabled 536 (in one implementation, the drive circuit is switched so that a bleeder transistor 330 and associated series resistance 332 slowly discharge the charge transistor output). By disabling the drive signal to the charge transistor, the transistor turns more off, resulting in an increased resistance across the drain-source junction, and necessarily a larger potential (i.e., voltage drop) across the transistor. The larger potential across the transistor translates into a higher potential level presented to the battery management system input.

Alternatively, if the potential level of the battery management system input is above a maximum DUVR threshold level 538, then the drive circuit associated with the charge transistor is switched to be enabled (e.g., pumped up by the charge pump in gate driver 302 for a predetermined number of cycles) 540. By enabling the drive signal to the charge transistor, the transistor turns more on, resulting in a decreased resistance across the drain-source junction, and necessarily a smaller potential (i.e., voltage drop) across the transistor. The smaller potential across the transistor translates into a lower potential level presented to the battery management system input. If neither condition is met 534, 538 then the process continues checking (as required) to determine the potential presented to the battery management system at step 532.

In one implementation, the DUVR minimum threshold level is set to be above a substantially lowest operating point for the battery management system (i.e., $V_{fet}$ is at its minimum for normal battery management system operation). Similarly, in one implementation, the DUVR maximum threshold level is set to be just below the transition level associated with a mode transition from pre-charge to rapid or normal charge mode in the charger (i.e., just below the pre-charge threshold level less a diode drop).

Those of ordinary skill in the art will recognize that some conventional chargers monitor the battery cell potential to determine when to switch from a pre-charge to a rapid charge mode. In these conventional systems, the charger typically monitors cell potential at the battery pack terminals. Accordingly, the regulation of the potential at the input to the battery management system can in effect as well regulate the potential seen by the charger thereby preventing the transition from a pre-charge mode to a rapid charge mode in the charger until the battery cells are "ready" (e.g., the battery cells have been brought up to an appropriate potential in an appropriate amount of time).

A number of embodiments of the invention have been described. Nevertheless, it will be understood that various modifications may be made without departing from the spirit and scope of the invention. For example, while one method for partially enabling the charge transistor in a battery management system during deep under-voltage recovery is described, other methods for regulating the charge transistor voltage drop across the drain-source junction are possible. Further, other circuits, logic, program instructions, etc. can be used to regulate the potential seen at the input to the battery management system and hence at the input to a coupled charger. Accordingly, other embodiments are within the scope of the following claims.

What is claimed is:

1. A method for charging a battery system comprising:
   determining that a charger is coupled to a battery system, the battery system including one or more cells and a charge transistor, where:
   the battery system is distinct from the charger,
   the charger monitors a voltage level of the battery system, and
   the charger is operable to charge in two or more modes of operation and switch between the two or more modes of operation based on the voltage level of the battery system monitored by the charger;
   determining that a voltage level of the cells is less than a first low voltage level, where the voltage level of the cells is distinct from the voltage level of the battery system monitored by the charger;
   charging the cells at a reduced rate including adjusting a voltage applied to a charge transistor gate terminal, including:
   regulating the voltage level of the battery system monitored by the charger to a level that is less than a second voltage level, where the charger does not switch between the two or more modes of operation, and supplying a minimum operating voltage for at least one component of the battery system; and when the voltage of the cells reaches the first low voltage level, substantially fully enabling the charge transistor to allow the charger to switch between the two or more modes of operation.

2. The method of claim 1 where adjusting a voltage applied to the gate terminal of the charge transistor includes partially enabling the charge transistor.

3. The method of claim 2 where partially enabling the charge transistor includes partially enabling the charge transistor until a voltage of the cells exceeds the first low voltage level.

4. The method of claim 2 where partially enabling the charge transistor includes adjusting a potential across the charge transistor to be higher than a difference between a potential of the cells and the minimum operating voltage.

5. The method of claim 2 where:
the two or more modes of operation include a reduced charge rate mode of charging and a normal charge rate mode of charging;
the charger switches to the reduced charge rate mode of charging when the voltage level of the battery system monitored by the charger is less than the first low voltage level; and
the charger switches to the normal charge rate mode of charging when the voltage level of the battery system monitored by the charger reaches the first low voltage level.

6. The method of claim 1 where the battery system includes a battery management system including battery monitoring circuitry and where adjusting a voltage applied to the charge transistor includes adjusting a drive signal to the charge transistor to maintain a voltage seen at an input to the battery management system at a level higher than a minimum operating voltage for the battery management system.

7. The method of claim 1 where the battery system includes a battery management system including battery monitoring circuitry and where adjusting a voltage applied to the charge transistor includes adjusting a drive signal to the charge transistor to maintain a voltage seen at an input to the battery management system at a level that is lower than a voltage level where the charger will switch from a reduced charge rate to a normal charge rate.

8. The method of claim 1 further comprising:
prior to charging the cells at a reduced rate, enabling monitoring circuitry in the battery system; and
monitoring the reduced rate charging of the cells.

9. The method of claim 8 further comprising safety monitoring the battery system while charging.

10. The method of claim 8 further comprising monitoring a change in a capacity of the cells of the battery system while charging.

11. The method of claim 1 where adjusting a voltage applied to the charge transistor includes determining if an operating voltage of the battery system is above a predefined maximum, and if so, increasing a drive voltage presented to the charge transistor.

12. The method of claim 1 where adjusting a voltage applied to the charge transistor includes determining if an operating voltage of the battery system is below a predefined minimum, and if so, decreasing a drive voltage presented to the charge transistor.

13. The method of claim 1 further including:
enabling the charge monitor control circuitry included in the battery system prior to charging the cells.

14. The method of claim 1 further comprising:
monitoring, using monitoring circuitry of the battery system, the one or more cells voltage level and determining if the monitored voltage level is below the first threshold voltage level.

15. An apparatus comprising:
a high-side NFET charge transistor;
a drive circuit for driving the high-side NFET charge transistor; and
a monitor circuit coupled to the drive circuit for monitoring a voltage level of a battery cell to be charged;
where, when a charger distinct from the apparatus is coupled to the apparatus, the drive circuit is operable to perform operations comprising:
partially enabling the high-side NFET charge transistor if the voltage level of the battery cell is below a first threshold level including supplying a minimum operating voltage of the monitor circuit, where the charger does not switch between two or more modes of operation, and
substantially fully enabling the charge transistor when the voltage level of the battery cell reaches the first threshold level to allow the charger to switch between the two or more modes of operation.

16. The apparatus of claim 15 where:
partially enabling the high-side NFET charge transistor further includes regulating a voltage level of the apparatus monitored by the charger to a level that is less than a second voltage level.

17. The apparatus of claim 16 where:
the drive circuit includes a recovery circuit operable to control partially enabling the high-side NFET charge transistor, the recovery circuit including:
a combinational logic circuit;
a plurality of comparators coupled to the combinational logic circuit; and
a switch coupled to the plurality of comparators and operable to partially enable the high-side NFET charge transistor based on a signal from the plurality of comparators.

* * * * *

UNITED STATES PATENT AND TRADEMARK OFFICE
CERTIFICATE OF CORRECTION

| | | |
|---|---|---|
| PATENT NO. | : 7,605,568 B2 | Page 1 of 1 |
| APPLICATION NO. | : 11/373843 | |
| DATED | : October 20, 2009 | |
| INVENTOR(S) | : Gunnar Gangstoe et al. | |

It is certified that error appears in the above-identified patent and that said Letters Patent is hereby corrected as shown below:

Column 14, Line 60 at Claim 1; replace:
"first low voltage level,where the voltage level of the cells" with
-- first low voltage level, where the voltage level of the cells --

Column 16, Line 12 at Claim 13; replace:
"enabling the charge monitor control circuitry included in" with
-- enabling charge monitor control circuitry included in --

Column 16, Line 30 at Claim 15; replace:
"threshold level including supplying a minimum oper-" with
-- threshold level, including supplying a minimum oper- --

Signed and Sealed this

Twenty-sixth Day of January, 2010

David J. Kappos
*Director of the United States Patent and Trademark Office*